United States Patent Office 2,753,290
Patented July 3, 1956

2,753,290

MICROBIOLOGICAL PRODUCTION OF 7- AND 15-HYDROXY-PROGESTERONES

Josef Fried, New Brunswick, Richard W. Thoma, Somerville, David Perlman, Princeton, and John R. Gerke, Franklin Township, Somerset County, N. J., assignors to Olin Mathieson Chemical Corporation, New York, N. Y., a corporation of Virginia No Drawing. Application August 6, 1953,
Serial No. 372,798

4 Claims. (Cl. 195—51)

This invention relates to, and has for its object the provision of, certain oxidized derivatives of steroids, and bio-synthetic methods of producing them. These oxidized derivatives of steroids, notably the 15-hydroxy-progesterones, 7-hydroxy-progesterones, and 15-keto-progesterones, are valuable intermediates for the preparation of physiologically-active steroids and/or other useful products.

More particularly, the method of the invention involves subjecting a 7- and/or 15-desoxy steroid of the pregnane (including pregnene) series especially a 7- and/or 15-desoxy 3-keto- $\Delta^4$-pregnene, and notably progesterone, to the action of an enzyme (or enzymes, or enzyme systems) of a particular group of microorganisms in an aqueous medium in the presence of oxygen, and recovering the 7- and/or the 15-hydroxy steroid formed. The action of the enzyme can be utilized either by including the steroid substrate in an aerated culture of the microorganism in or on a suitable nutrient medium, or by bringing together in an aqueous medium the steroid substrate, oxygen, and the enzyme of non-proliferating cells of the microorganism, the first alternative being preferred.

The particular group of microorganisms utilizable for the purposes of this invention is that constituted by Penicillium sp. A. T. C. C. 11,598 (this catalogue number being the identification given the microorganism on deposit at the American Type Culture Collection, Washington, D. C.), *Streptomyces aureus*, Streptomyces sp. W. C. 3676 (this number being the identification given the microorganism on deposit in the Waksman Collection, New Jersey Agricultural Experiment Station, New Brunswick, New Jersey), *Colletotrichum antirrhini*, and *Phycomyces blakesleeanus*.

The 7- and/or 15-desoxy steroids utilizable in the method of this invention include, inter alia, progesterone, 11-desoxy-17α-hydroxy-corticosterone, desoxy-corticosterone, 17α-hydroxy-progesterone, 16α-hydroxy-progesterone, pregnanolone, and $\Delta^5$-pregnenolone.

A suitable nutrient medium essentially comprises a source of nitrogenous factors, and an assimilable source of carbon and energy. The latter may be a carbohydrate (such as sucrose, molasses, glucose, maltose, starch, or dextrin) and/or the steroid substrate itself. Preferably, however, the medium includes an assimilable source of carbon and energy in addition to the steroid substrate; and preferably also, this source is at least in substantial part a member of the group consisting of (1) fat acids having at least 14 carbon atoms and (2) fats. Use of such lipid source of carbon and energy (especially use of a fatty oil) is advantageous in that it regulates the availability of the steroid substrate for conversion.

Among the fats utilizable for the purpose of this invention are: lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein, and trilaurin. Among the fat acids utilizable for the purpose of this invention are: stearic acid, palmitic acid, oleic acid, linoleic acid, and myristic acid.

The source of nitrogenous factors may be organic (e. g., soybean meal, corn steep liquor, meat extract, and/or distillers solubles) or synthetic (i. e., composed of simple, synthesizable organic and inorganic compounds such as ammonium salts, alkali nitrates, amino acids or urea).

An adequate sterile-air supply should be maintained during fermentation, for example, by the conventional methods of exposing a large surface of the medium to air or by utilizing submerged aerated culture.

The steroid substrate may be added to the culture during the incubation period, or included in the medium prior to sterilization or inoculation. The preferred (but not limiting) range of concentration of the steroid substrate in the culture is about 0.025 to 0.25%. The culture period (or rather the time of subjecting the steroid substrate to the action of the enzyme) may vary considerably, the range of about 5 to 100 hours being feasible, but not limiting.

The 7- and/or the 15-hydroxy steroid may be recovered from the culture in which it is formed by separating the culture solids, extracting the culture liquid with a chlorinated hydrocarbon solvent, and chromatographically separating the 7- and/or the 15-hydroxy steroid from the extracted material. Utilizable chlorinated hydrocarbon solvents include, inter alia, chloroform, ethylene dichloride, and trichlorethylene.

The following examples are illustrative of the invention:

EXAMPLE 1

(a) Fermentation

A medium of the following composition is prepared:

| | G. |
|---|---|
| Cornsteep liquor solids | 3 |
| $NH_4H_2PO_4$ | 3 |
| $CaCO_3$ | 2.5 |
| Soybean oil | 2.2 |
| Progesterone | 0.50 |
| Distilled water to make one liter. | |

The pH of the medium is adjusted to 7.0±0.1 (with sodium hydroxide solution); and 100 ml. portions of the medium are distributed in 500 ml. Erlenmeyer flasks, and the flasks plugged with cotton and sterilized by autoclaving for 30 minutes at 120°. When cool, each of the flasks is inoculated with 5–10% of a vegetative inoculum of Penicillium sp. A. T. C. C. 11,598 obtained as described hereinafter. The flasks are mechanically shaken for 72 hours in a room maintained at 25°; and the contents of the flasks are pooled, adjusted to pH 4.0±0.2 with sulfuric acid, and filtered by suction through Seitz filter pads. [The vegetative inoculum used is grown from stock cultures (lyophilized vial or agar slant) for 24–72 hours (with or without successive 24–72 hour periods) in a medium of the following composition: 15 g. cornsteep liquor solids; 10 g. brown sugar; 6 g. $NaNO_3$; 0.001 g. $ZnSO_4$; 1.5 g. anhydrous $KH_2PO_4$; 0.5 g. $MgSO_4 \cdot 7H_2O$; 5 g. $CaCO_3$; 2 g. lard oil; and distilled water to make one liter, the medium being sterilized by autoclaving for 30 minutes at 120°.]

(b) Isolation of the 15α-hydroxy-progesterone formed 1890 ml. of a culture filtrate obtained as described in section *a* by fermentation of 1.0 g. of progesterone is extracted with four 900 ml. portions of chloroform. The chloroform solutions are combined and evaporated to dryness in vacuo. The residue, weighing about 358 mg., crystallizes readily from acetone, and yields a total of about 100 mg. of crystalline material melting at 225–230°. This material may be purified by chromatography on a sulfuric acid-washed alumina column. For this purpose, 38 mg. of the crystalline material is dissolved in 1 ml.

chloroform and 3 ml. benzene, and chromatographed on 1 g. alumina. Elution of the column with 200 ml. of a mixture of 1 part of chloroform and three parts of benzene, followed by 80 ml. of a mixture of equal volumes of chloroform-benzene, yields about 32 mg. of a 15α-hydroxy-progesterone (A), which after one recrystallization melts at about 231–232°; $[\alpha]_D^{22}+219°$ (c, 0.94 in CHCl₃); λalc.max. 240mμ (ε=16,500); λNujolmax. 2.93μ (OH); 5.92μ (sat. CO); 6.02μ (conj. CO); 6.19μ (conj. double bond).

*Anal.*—Calcd. for $C_{21}H_{30}O_3$: C, 76.33; H, 9.15. Found: C, 7614; H, 9.00.

Continued elution of the column with 175 ml. chloroform yields about 9 mg. of material (probably an X,15α-dihydroxy-progesterone), which after one crystallization melts at about 251–253°; $[\alpha]_D^{22}+202°$.

*Anal.*—Calcd. for $C_{21}H_{30}O_4$: C, 72.80; H, 8.73. Found: C, 73.30; H, 9.54.

(c) *Oxidation of the 15α-hydroxy-progesterone to 15-keto-progesterone*

To a solution of 20 mg. of 15α-hydroxy-progesterone obtained as described in section b (melting at 225–230°) in 2 ml. of glacial acetic acid is added a solution of 10 mg. of chromic acid in 2 ml. acetic acid. One hour later, 0.2 ml. of alcohol is added; and after an additional 10 minutes the solution is evaporated to small volume in vacuo. The residue is taken up in little water, and extracted 3 times with 5 ml. of chloroform. The chloroform solution is extracted with water, dilute sodium bicarbonate solution, and again with water, and after drying over sodium sulfate is evaporated to dryness in vacuo. The residue, weighing about 20 mg., is crystallized from acetone-hexane, and yields 15-keto-progesterone having the following properties: M. P. about 157–160°, $[\alpha]_D^{24}+195°$ (c, 0.50 in CHCl₃); λalc.max. 239 mμ (ε=16,400); Nujolmax. 5.77μ (sat. ring D CO); 5.89μ (sat. CO), 6.06μ (conj. CO).

*Anal.*—Calcd. for $C_{21}H_{28}O_3$: C, 76.79; H, 8.59. Found: C, 76.90; H, 8.57.

EXAMPLE 2

(a) *Fermentation*

A fermentation medium of the following composition is prepared:

| | G. |
|---|---|
| Soybean oil | 2.2 |
| Progesterone | 0.25 |
| Soybean meal | 15 |
| Glucose | 10 |
| CaCO₃ | 2.5 |

Water to make one liter.

100 ml. portions of the medium are distributed in 500 ml. Erlenmeyer flasks, and the flasks are plugged with cotton and sterilized by autoclaving. When cool, each of the flasks is inoculated with 5–10% of a vegetative inoculum of *Streptomyces aureus* which has been grown for 48–72 hours in a soybean meal-glucose medium. The flasks are mechanically shaken for 72 hours in a room maintained at 25°, and the contents of the flasks are pooled, adjusted to pH 4.0±0.2° with sulfuric acid, and filtered by suction through Seitz filter pads.

(b) *Isolation of the 15α-hydroxy-progesterone formed*

2,500 ml. of a culture filtrate obtained as described in section a by fermentation of 750 mg. progesterone is treated as described in section b of Example 1, yielding about 80 mg. crude steroids, from which the 15α-hydroxy-progesterone is readily isolated in crystalline form. The product is identical with that (A) described in section b of Example 1, both in composition and stereoisomeric form.

EXAMPLE 3

(a) *Fermentation*

The same fermentation conditions as described in section a of Example 2 are employed, except that Streptomyces sp. WC 3676 is employed in place of the *Streptomyces aureus*.

(b) *Isolation of the 15α-hydroxy-progesterone formed*

2500 ml. of a culture filtrate obtained as described in a by fermentation of 750 mg. progesterone is treated as described in section b of Example 1, yielding about 141 mg. of crude product, from which the 15α-hydroxy-progesterone crystallizes on rubbing with acetone. The product is identical with that (A) described in section b of Example 1, as indicated by its melting point, rotation, infrared spectrum, and mixed melting point.

EXAMPLE 4

(a) *Fermentation*

The same fermentation conditions as described in section a of Example 1 are employed, except that *Colletotrichum antirrhini* is employed in place of the Penicillium sp. A. T. C. C. 11,598.

(b) *Isolation of the 15α-hydroxy-progesterone formed*

1000 ml. of a culture filtrate obtained as described in a by fermentation of 300 mg. progesterone is treated as described in section b of Example 1, yielding about 129 mg. crude product, from which 15α-hydroxy-progesterone (A) may be crystallized.

EXAMPLE 5

(a) *Fermentation*

The same fermentation conditions as described in section a of Example 1 are employed, except that *Phycomyces blakesleeanus* is employed in place of the Penicillium sp. A. T. C. C. 11,598.

(b) *Isolation of the 15β-hydroxy-progesterone and the 7-hydroxy-progesterone formed*

9 liters of a culture filtrate obtained as described in a by fermentation of 4.85 g. progesterone is extracted with six 2 liter portions of chloroform. The combined chloroform extract is filtered, and evaporated to dryness in vacuo. The residue, weighing about 1.31 g., is taken up in 25 ml. 80% aqueous methanol, and the resulting solution extracted with five 25 ml. portions of hexane. The methanol solution is then evaporated to dryness, and the residue (weighing about 1.023 g.) is dissolved with warming in 1 ml. of chloroform and and 4 ml. of benzene. The resulting solution is chromatographed on 20 g. of sulfuric acid-washed alumina. Elution with 400 ml. of a mixture of 1 part of chloroform and 4 parts of benzene yields about 470 mg. of a 15β-hydroxy-progesterone (B), which after recrystallization from acetone melts at about 204–205° C., $[\alpha]_D^{22}+151°$ (c, 0.98 in CHCl₃); λalc.max. 241 mμ (ε=15,800); λNujolmax. 2.96μ (OH); 5.90μ (sat. CO); 6.06μ (conj. CO); 6.19μ (conj. double bond).

*Anal.*—Calcd. for $C_{21}H_{30}O_3$: C, 76.33; H, 9.15. Found: C, 76.31; H, 8.90.

Subsequent elution of the column with equal volumes of benzene-chloroform yields in the first 175 ml. mixed products, and in the subsequent 800 ml. 175 mg. of a 7-hydroxy-progesterone. The latter, after two crystallizations from acetone, melts at about 229–230°, $[\alpha]_D^{22}+167°$ (c, 0.99 in CHCl₃); λalc.max. 241 mμ (ε=15,300), λ2.5% KOH in MeOHmax. after 24 hours 283 mμ (ε=23,100), λNujolmax. 3.03μ (OH); 5.88μ (sat. CO), 6.06μ (conj. CO); 6.22μ (conj. double bond).

*Anal.*—Calcd. for $C_{21}H_{30}O_3$: C, 76.33; H, 9.15. Found: C, 76.33; H, 9.25.

(c) Oxidation of 15β-hydroxy-progesterone (B) to 15-keto-progesterone

The oxidation of 22 mg. of 15β-hydroxy-progesterone (B) is conducted as described for the 15α-hydroxy-progesterone (A) in section c of Example 1. The recrystallized product has the following properties: M. P. 159–160°, $[\alpha]_D^{23}$ +200° (c, 0.49 in $CHCl_3$); $\lambda$alc.max. 238 mμ ($\epsilon$=16,000). The infrared spectrum is identical with that of the product obtained in section c of Example 1, and the melting point of a mixture of the two products shows no depression. The two 15-hydroxy-progesterone products (A and B) are accordingly epimers.

(d) Conversion of 7-hydroxy-progesterone into Δ⁶-dehydroprogesterone

A solution of 15 mg. of the 7-hydroxy-progesterone obtained as described in section b, in 5 ml. of 2.5% KOH in methanol, is refluxed for one hour. After cooling, 5 ml. water is added, and the methanol is removed in vacuo. The aqueous residue is extracted with chloroform, and the chloroform solution washed with water. After drying over sodium sulfate, the solvent is removed in vacuo, and the residue (weighing about 12.0 mg.) is dissolved in 0.25 ml. of benzene and 1 ml. of hexane for chromatography on alumina (250 mg.). Elution of the alumina column with benzene-hexane (1:4) yields a crystalline material, which after two recrystallizations melts at about 133–137°, $\lambda$alc.max. 283 mμ (28,000). Infrared comparison with an authentic sample of Δ⁶-dehydroprogesterone (M. P. 145–146°) shows these two products to be identical.

Where the steroid substrate is included in the fermentation medium before inoculation, it is preferable to dissolve it in chloroform for ease of handling, the chloroform being removed from the medium during sterilization (i. e. before inoculation). The conversion may be effected by bringing together the steroid substrate and oxygen in an aqueous suspension of non-proliferating cells of the microorganism, or by bringing together the steroid substrate, oxygen, and enzymes of the microorganism in an aqueous cell-free medium. Other expedients conventional in microbiological oxidation may be employed in the practice of this invention. Thus, the microorganism may be grown on a medium best adapted for its propagation; the mycelium separated from the culture liquid after substantial propagation; and the mycelium resuspended in a new fermentation medium containing the steroid substrate. Also the mycelium may be used repeatedly, i. e., the culture liquid containing the oxidized derivative separated from the mycelium, the former treated for recovery of the oxidized derivative, and the latter resuspended in a new batch of fermentation medium containing the steroid substrate.

The invention may be variously otherwise embodied within the scope of the appended claims.

We claim:

1. The method of producing a member of the group consisting of 7-hydroxy steroids and 15-hydroxy-steroids of the progesterone series, which comprises subjecting progesterone to the action of an enzyme of a microorganism in an aqueous medium in the presence of oxygen, the microorganism being selected from the group consisting of *Streptomyces aureus*, *Colletotrichum antirrhini* and *Phycomyces blakesleeanus*, and isolating the hydroxy-steroid formed.

2. The method of producing 15α-hydroxyprogesterone which comprises subjecting progesterone to the action of an enzyme of *Streptomyces aureus* in an aqueous medium in the presence of oxygen, and isolating the 15α-hydroxy-progesterone formed.

3. The method of producing 15α-hydroxyprogesterone which comprises subjecting progesterone to the action of an enzyme of *Colletotrichum antirrhini* in an aqueous medium in the presence of oxygen, and isolating the 15α-hydroxyprogesterone formed.

4. The method of producing 15β-hydroxyprogesterone and a 7-hydroxyprogesterone, which comprises subjecting progesterone to the action of an enzyme of *Phycomyces blakesleeanus* in an aqueous medium in the presence of oxygen, and isolating the hydroxyprogesterones formed.

References Cited in the file of this patent

UNITED STATES PATENTS

| | | |
|---|---|---|
| 2,602,769 | Murray et al. | July 8, 1952 |
| 2,666,070 | Murray et al. | Jan. 12, 1954 |
| 2,672,466 | Murray et al. | Mar. 16, 1954 |